US012774033B2

(12) United States Patent
Lee et al.

(10) Patent No.: US 12,774,033 B2
(45) Date of Patent: Oct. 27, 2026

(54) SIDE SILL FOR VEHICLE

(71) Applicant: POSCO CO., LTD, Pohang-si (KR)

(72) Inventors: Gyu-Min Lee, Incheon (KR); Jong-Cheol Park, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 127 days.

(21) Appl. No.: 18/708,845

(22) PCT Filed: Nov. 3, 2022

(86) PCT No.: PCT/KR2022/017117
§ 371 (c)(1),
(2) Date: Oct. 29, 2024

(87) PCT Pub. No.: WO2023/090706
PCT Pub. Date: May 25, 2023

(65) Prior Publication Data

US 2025/0187667 A1 Jun. 12, 2025

(30) Foreign Application Priority Data

Nov. 16, 2021 (KR) ........................ 10-2021-0157839

(51) Int. Cl.
*B62D 21/15* (2006.01)
*B62D 25/02* (2006.01)
*B62D 29/00* (2006.01)

(52) U.S. Cl.
CPC ........... *B62D 21/15* (2013.01); *B62D 25/025* (2013.01); *B62D 29/00* (2013.01)

(58) Field of Classification Search
None
See application file for complete search history.

(56) References Cited

U.S. PATENT DOCUMENTS 6,409,257 B1 * 6/2002 Takashina ............ B62D 21/157 296/203.03
9,493,190 B1 * 11/2016 Alwan ................. B62D 25/025
(Continued)

FOREIGN PATENT DOCUMENTS

CN 113039080 A 6/2021
EP 2154052 A1 2/2010
(Continued)

OTHER PUBLICATIONS

Office Action dated Jun. 3, 2025 issued in corresponding Japanese Patent Application No. 2024-528558.
(Continued)

*Primary Examiner* — Joseph D. Pape
(74) *Attorney, Agent, or Firm* — Morgan Lewis & Bockius LLP

(57) ABSTRACT

The present disclosure provides a side sill for a vehicle comprising: a first side sill frame; a second side sill frame coupled to the first side sill frame to form a hollow portion together with the first side sill frame; a first reinforcing frame disposed in the hollow portion and having one side bonded to the first side sill frame to form a first closed cross-section; and a second reinforcing frame disposed in the hollow portion and having one side bonded to the first reinforcing frame to form a second closed cross-section, wherein the first reinforcing frame and the second reinforcing frame include a concavo-convex portion that is continuously formed along the longitudinal direction of the vehicle.

13 Claims, 15 Drawing Sheets

(56) References Cited

U.S. PATENT DOCUMENTS

| | | | | |
|---|---|---|---|---|
| 12,172,508 | B2 | 12/2024 | Kecalevic et al. | |
| 2006/0005503 | A1 | 1/2006 | Bladow et al. | |
| 2011/0020689 | A1 | 1/2011 | Nam et al. | |
| 2017/0036629 | A1 | 2/2017 | Ishizaki | |
| 2017/0274936 | A1 | 9/2017 | Ishii et al. | |
| 2018/0236863 | A1* | 8/2018 | Kawabe | B60K 1/04 |
| 2018/0304937 | A1 | 10/2018 | Kita et al. | |
| 2020/0369324 | A1 | 11/2020 | Koga et al. | |
| 2021/0070371 | A1 | 3/2021 | Ebisumoto et al. | |
| 2022/0016966 | A1 | 1/2022 | Kecalevic et al. | |

FOREIGN PATENT DOCUMENTS

| | | | | |
|---|---|---|---|---|
| JP | 2011-530450 | A | 12/2011 | |
| JP | 2018-184051 | A | 11/2018 | |
| JP | 6455222 | B2 | 12/2018 | |
| JP | 6484140 | B2 | 2/2019 | |
| JP | 2021-41817 | A | 3/2021 | |
| KR | 20-1997-0023057 | U | 11/1995 | |
| KR | 970006062 | B1 * | 4/1997 | F25B 41/20 |
| KR | 10-1997-0020847 | A | 5/1997 | |
| KR | 0142928 | B1 * | 8/1998 | B62D 25/025 |
| KR | 10-1998-0053512 | A | 9/1998 | |
| KR | 20-1998-0043143 | U | 9/1998 | |
| KR | 10-1482462 | B1 | 1/2015 | |
| KR | 10-2245229 | B1 | 4/2021 | |
| KR | 10-2023-0001131 | A | 1/2023 | |
| WO | 2020/225590 | A1 | 11/2020 | |
| WO | 2021/071410 | A1 | 4/2021 | |

OTHER PUBLICATIONS

Extended European Search Report dated Feb. 7, 2025, issued in corresponding European Patent Application No. 22895913.6.

International Search Report and Written Opinion dated Feb. 16, 2023 issued in International Patent Application No. PCT/KR2022/017117 (with English translation).

Chinese Office Action dated Aug. 27, 2026 issued in Chinese Patent Application No. 202280075711.8 (with English translation).

* cited by examiner

I - I'

II - II'

SIDE SILL FOR VEHICLE

CROSS-REFERENCE OF RELATED APPLICATIONS

This application is the U.S. National Phase under 35 U.S.C. § 371 of International Patent Application No. PCT/KR2022/017117, filed on Nov. 3, 2022, which in turn claims the benefit of Korean Application No. 10-2021-0157839, filed on Nov. 16, 2021, the disclosures of which applications are incorporated by reference herein.

TECHNICAL FIELD

The present disclosure relates to a side sill for a vehicle.

BACKGROUND ART

It should be noted that the content described in this section simply provides background information on the present disclosure and does not constitute prior art.

A side sill applied to an eco-friendly vehicle such as an electric vehicle play a role in protecting not only passengers but also batteries disposed on a floor. Since batteries are relatively bulky as compared to other components of a vehicle, a side space of a vehicle equipped with a battery is relatively narrow as compared to a vehicle equipped with an internal combustion engine.

Therefore, the side sill applied to an eco-friendly vehicle must be able to absorb maximum impact energy within a narrow space, and must have a minimum weight in order to improve the energy efficiency of an eco-friendly vehicle.

To this end, an aluminum extrusion material has been applied to the side sill of an eco-friendly vehicle, but it is still necessary to improve collision energy absorption performance and achieve weight reductions.

(Patent Document 1) KR 20-1998-0043143 U

SUMMARY OF INVENTION

Technical Problem

An aspect of the present disclosure is to provide a side sill for a vehicle which may efficiently absorb collision energy and achieve weight reduction.

An aspect of the present disclosure is to provide a side sill for a vehicle which may safely protect passengers and a battery as a core component by minimizing the amount of indoor inflow caused by a collision.

Solution to Problem

According to an aspect of the present disclosure, provided is a side sill for a vehicle including: a first side sill frame; a second side sill frame coupled to the first side sill frame to form a hollow portion together with the first side sill frame; a first reinforcing frame disposed in the hollow portion and having one side bonded to the first side sill frame to form a first closed cross-section; and a second reinforcing frame disposed in the hollow portion and having one side bonded to the first reinforcing frame to form a second closed cross-section, wherein the first reinforcing frame and the second reinforcing frame include a concavo-convex portion that is continuously formed in a longitudinal direction of the side sill for a vehicle.

At least one of the first side sill frame, the second side sill frame, the first reinforcing frame, and the second reinforcing frame may be formed of a steel material.

The concavo-convex portion may be configured so that a protruding surface and an insertion surface are alternately formed in a longitudinal direction of the side sill, and an inclined surface is formed between the protruding surface and the insertion surface, and each of the protruding surface, the insertion surface, and the inclined surface is continuously formed on a cross-section in a width direction-height direction of the side sill, intersecting a longitudinal direction of the side sill.

The protruding surface of the first reinforcing frame may overlap the protruding surface of the second reinforcing frame, and the insertion surface of the first reinforcing frame may overlap the insertion surface of the second reinforcing frame.

The inserting surface of the first reinforcing frame may be bonded to a first inner surface of the first side sill frame, and the protruding surface of the first reinforcing frame may be spaced apart from the first inner surface of the first side sill frame to form a first buffer space.

The inserting surface of the first reinforcing frame may have an installation length of 15 to 50 mm in the longitudinal direction of the side sill.

The protruding surface of the second reinforcing frame may be bonded to a second inner surface of the second side sill frame, and the insertion surface of the second reinforcing frame may be spaced apart from the second inner surface of the second side sill frame to form a second buffer space.

The protruding surface of the second reinforcing frame may have an installation length of 15 to 50 mm in the longitudinal direction of the side sill.

The first reinforcing frame and the second reinforcing frame may be configured so that the protruding surface and the insertion surface have an installation length of 15 to 50 mm in the longitudinal direction of the side sill, and a step portion of 2 to 10 mm is formed between the protruding surface and the insertion surface.

The first reinforcing frame and the second reinforcing frame are configured so that an installation width does not decrease from a second inner surface of the second side sill frame to a first inner surface of the first side sill frame.

The first reinforcing frame and the second reinforcing frame may be formed by bending a single steel sheet in multiple stages.

The first reinforcing frame may have a bending point with a shape of protruding outward from the first closed cross-section.

The first reinforcing frame may be formed so that the bending point is spaced apart from a first inner surface of the first side sill frame by 30% to 70% of an installation width of the first reinforcing frame.

The first reinforcing frame may include: a first section extending toward a first inner surface of the first side sill frame with the bending point as a boundary; and a second section bent with the bending point as a boundary to extend toward a second inner surface of the second side sill frame, and forming a bending angle with the first section in the first closed cross-section.

The first reinforcing frame may be configured so that the bending angle is formed inside the first closed cross-section, and the bending angle has a range of 165 to 175 degrees.

Advantageous Effects of Invention

According to an aspect of the present disclosure, a side sill for a vehicle may efficiently absorb collision energy and may achieve weight reduction.

According to an aspect of the present disclosure, a side sill for a vehicle may safely protect passengers and a battery as a core component by minimizing the amount of indoor inflow caused by a collision.

BEST MODE FOR INVENTION

Figure 1:
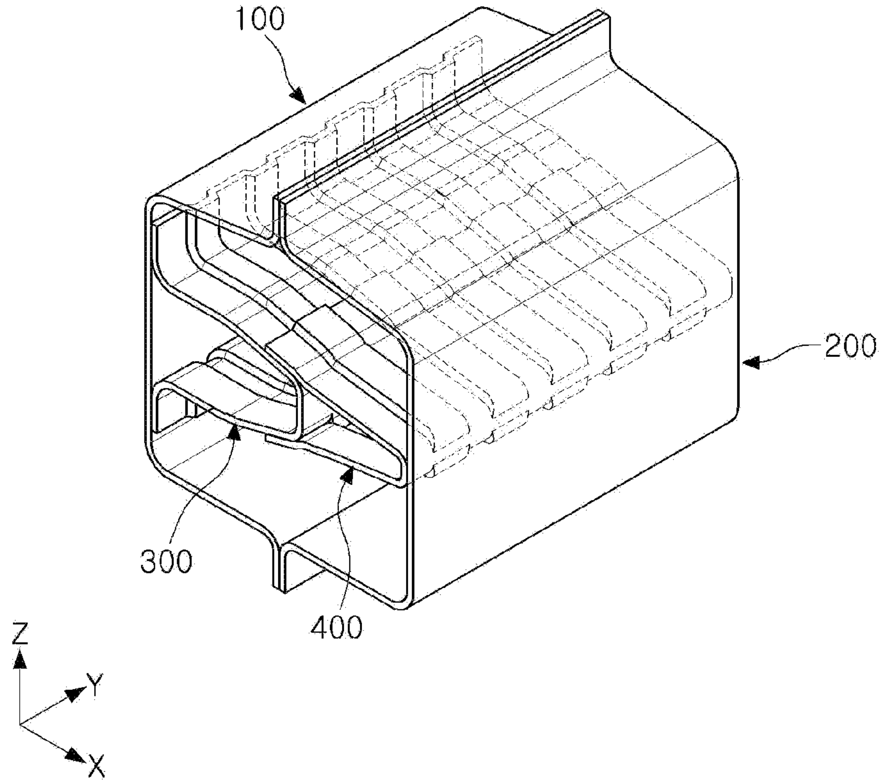
FIG. 1 is a perspective view of a side sill for a vehicle of a first comparative example in contrast to a side sill for a vehicle of the present disclosure.

Hereinafter, with reference to the drawings, specific embodiments of the present disclosure will be described. However, embodiments of the disclosed technology may be modified into various different forms, and the scope of the disclosed technology is not limited to the suggested embodiments. Furthermore, embodiments of the disclosed technology are provided to more fully explain the disclosed technology to those skilled in the art who understand the idea of the disclosed technology. In the drawings, the shapes and dimensions of elements may be exaggerated for further clarity.

Hereinafter, an X-axis illustrated in the attached drawing is a width direction of a side sill for a vehicle, a Y-axis is a longitudinal direction of the side sill for a vehicle, and a Z-axis is a height direction of the side sill for a vehicle.

FIG. 1 is a perspective view of a side sill for a vehicle of a first comparative example in contrast to a side sill for a vehicle of the present disclosure.

The first comparative example is different from the first embodiment to be described below in that a portion in which a concavo-convex portion P is not formed is formed in a longitudinal direction of the side sill.

In the case of the first comparative example, the deformation of a first reinforcing frame 300 and a second reinforcing frame 400 is not crushed in a symmetrical shape in the X-axis direction, and an asymmetrical unstable compression deformation may occur. This may be a major unstable factor in exhibiting stable collision energy absorption performance under various collision environments.

Hereinafter, components included in a side sill for a vehicle according to a first embodiment will be described in detail with reference to FIGS. 2 to 8.

Figure 2:
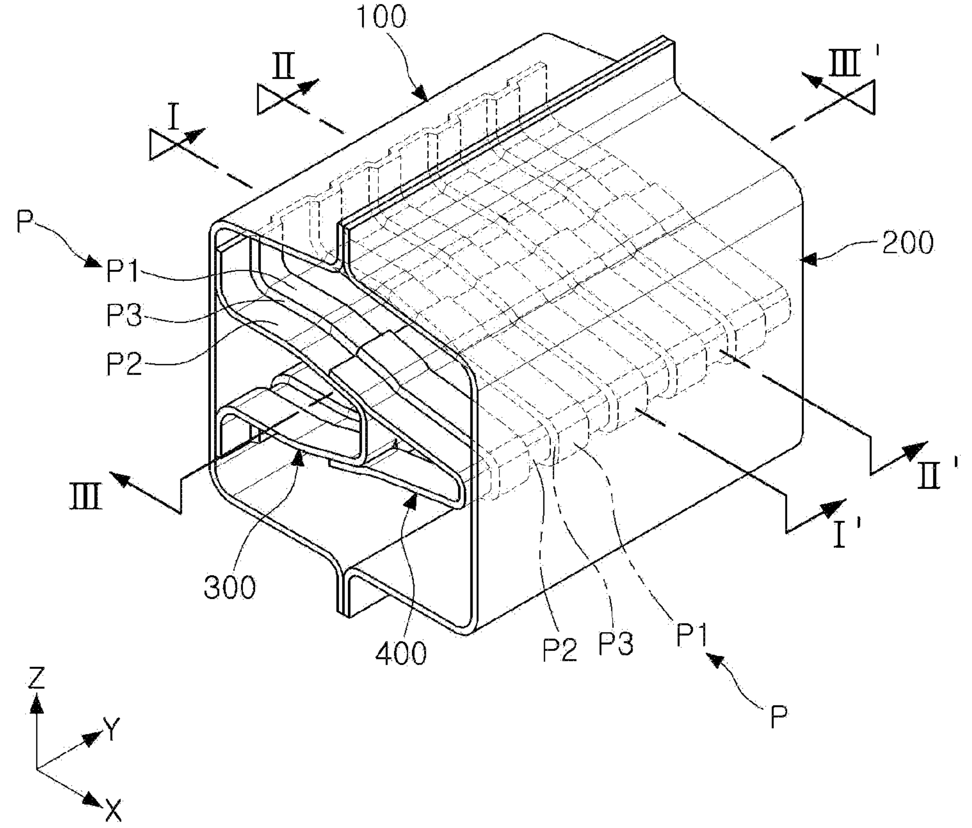
FIG. 2 is a perspective view of a side sill for a vehicle according to a first embodiment of the present disclosure.

FIG. 2 is a perspective view of a side sill for a vehicle according to a first embodiment of the present disclosure.

Figure 3:
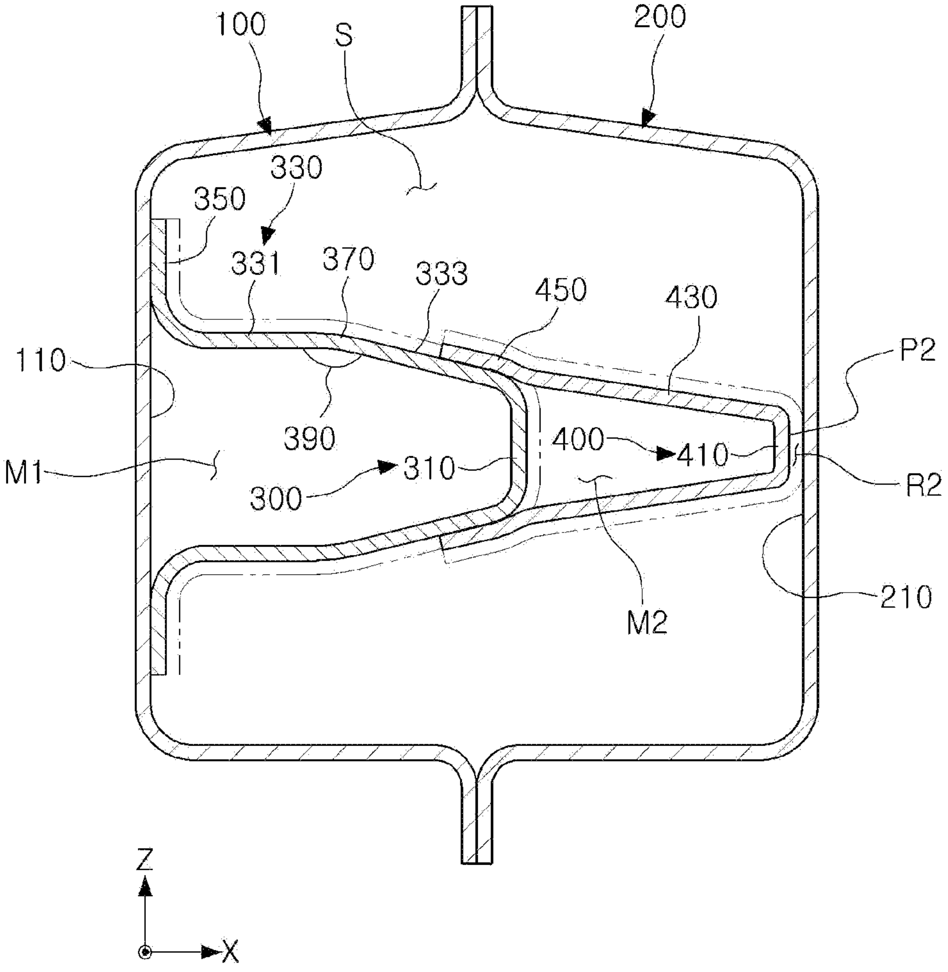
FIG. 3 is a cross-sectional view taken along line I-I' of FIG. 2.
Figure 4:
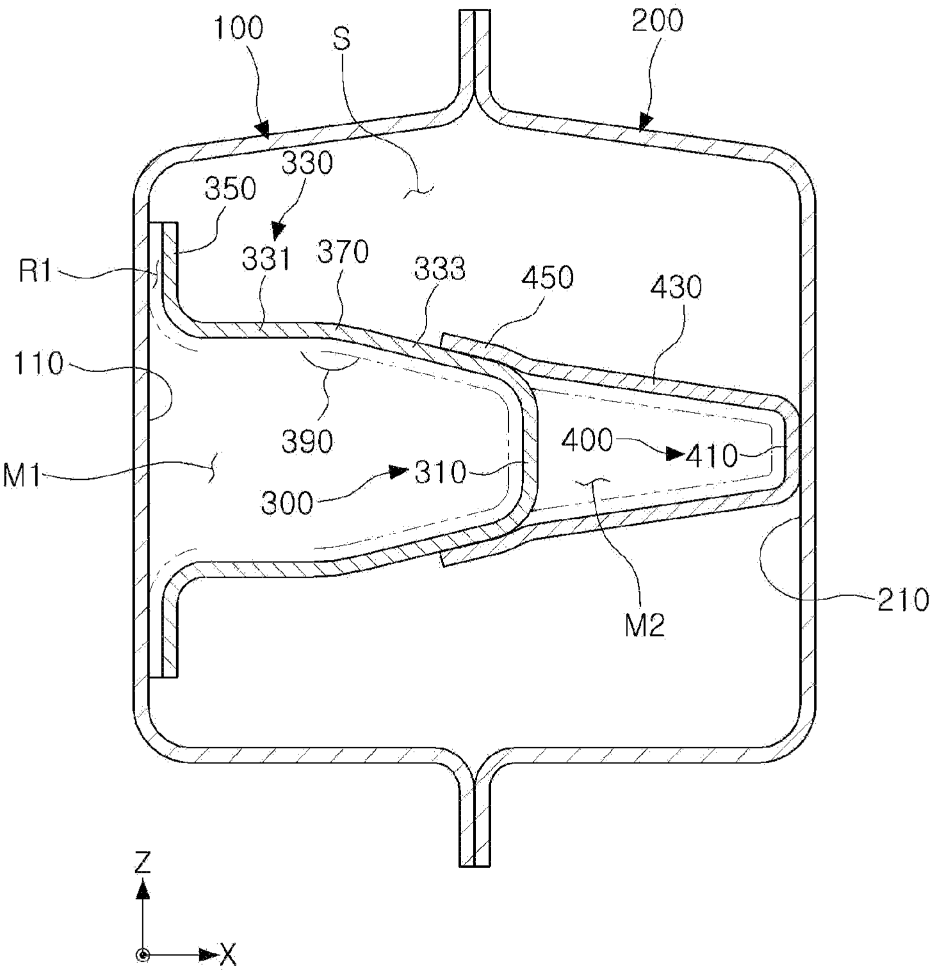
FIG. 4 is a cross-sectional view taken along line II-II' of FIG. 2.
Figure 5:
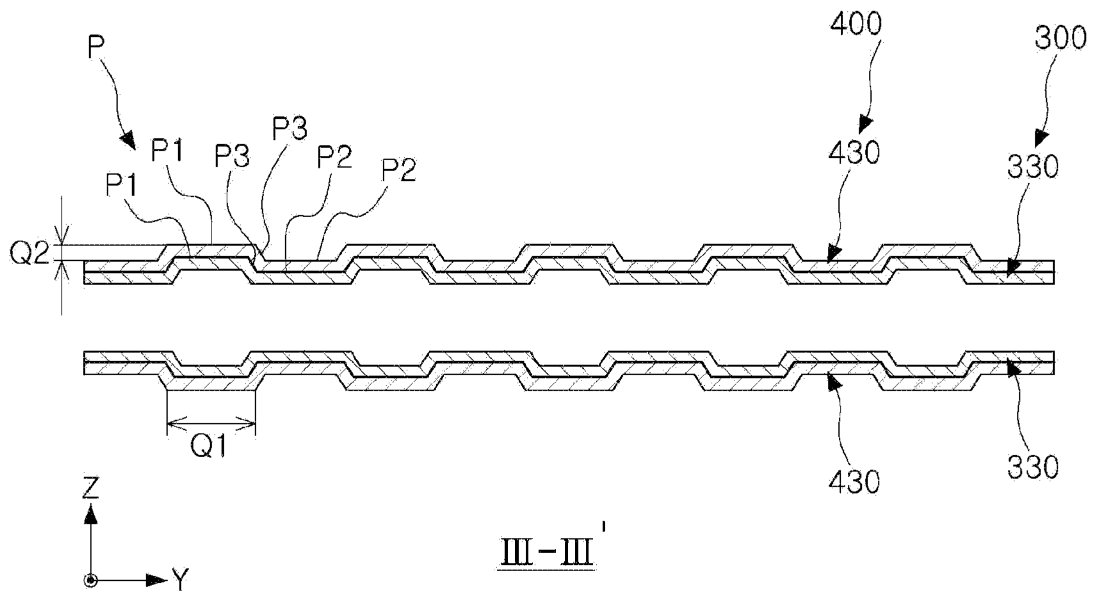
FIG. 5 is a cross-sectional view taken along line III-III' of FIG. 2.

FIG. 3 is a cross-sectional view taken along line I-I' of FIG. 2, FIG. 4 is a cross-sectional view taken along II-II' FIG. 2, and FIG. 5 is a cross-sectional view taken along line III-III' of FIG. 2.

Figure 6:
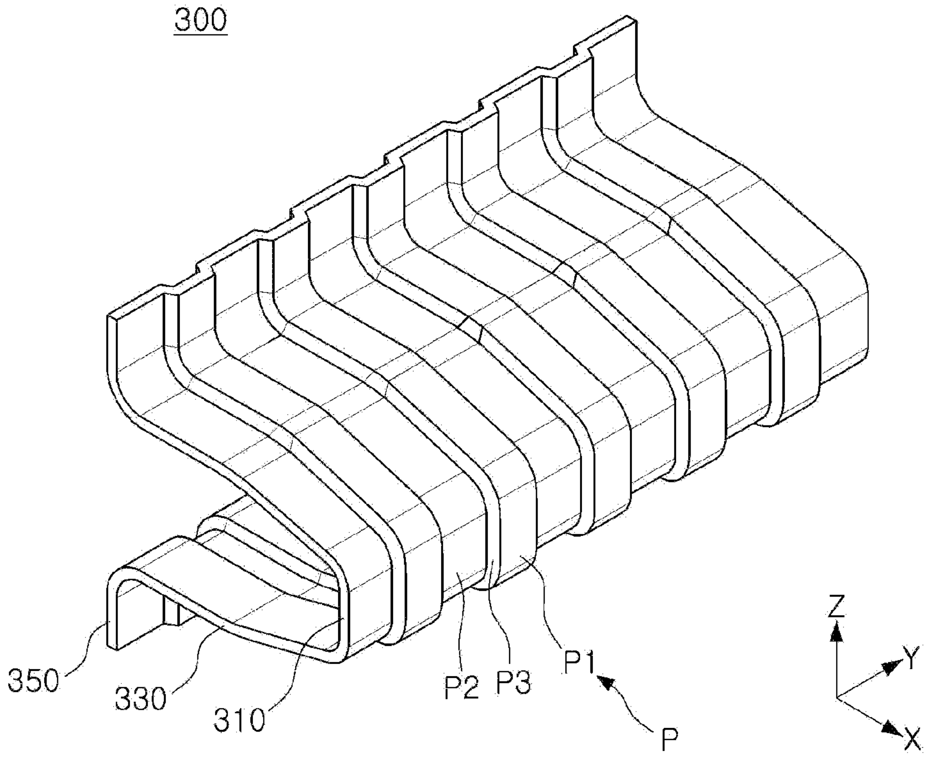
FIG. 6 is a perspective view of a first reinforcing frame of the side sill for a vehicle of FIG. 2.
Figure 7:
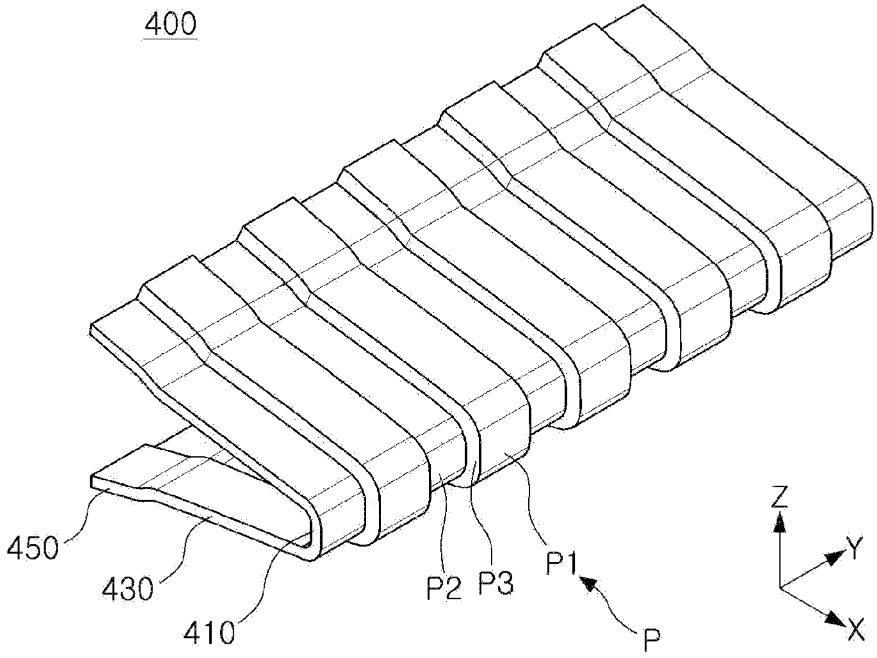
FIG. 7 is a perspective view of a second reinforcing frame of the side sill for a vehicle of FIG. 2.

FIG. 6 is a perspective view of a first reinforcing frame 300 of the side sill for a vehicle of FIG. 2, and FIG. 7 is a perspective view of a second reinforcing frame 400 of a side sill for a vehicle of FIG. 2.

Figure 8:
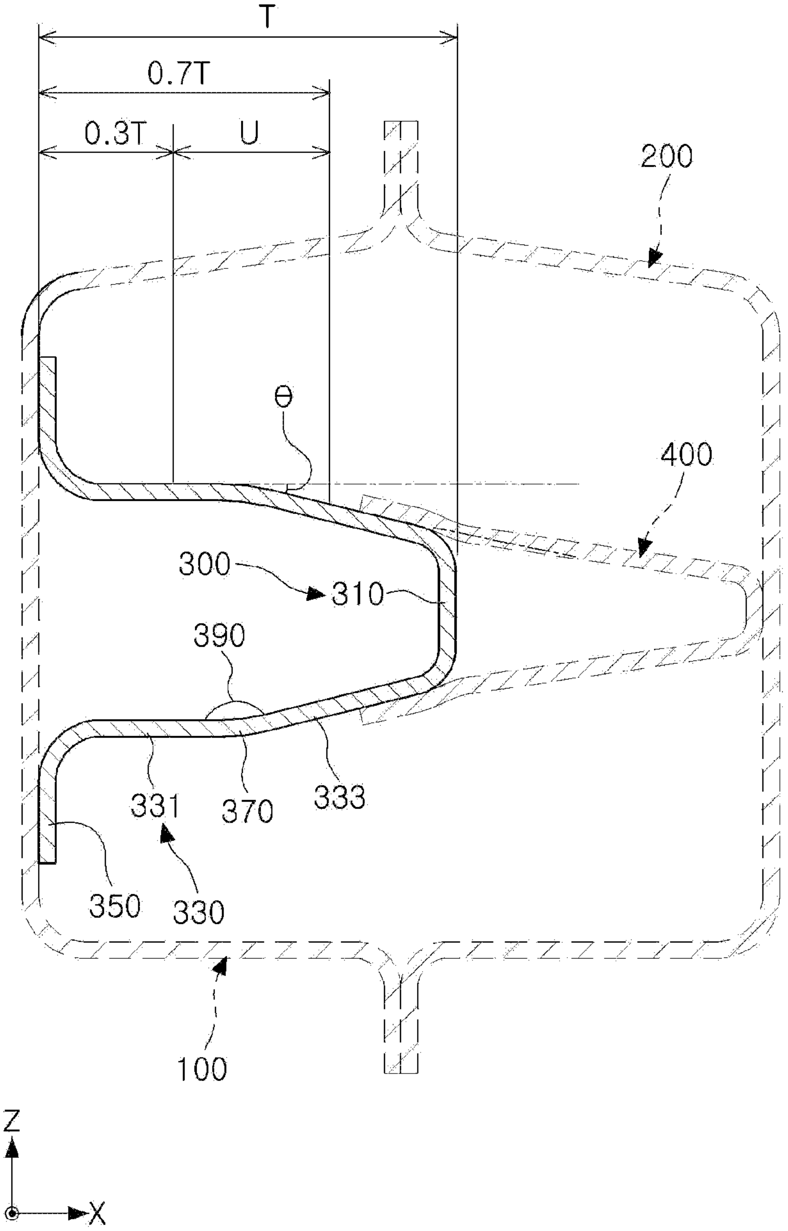
FIG. 8 is a view illustrating a position of a bending point of a side sill for a vehicle according to a first embodiment of FIG. 2.

FIG. 8 is a view illustrating a position of a bending point of a side sill for a vehicle according to a first embodiment of FIG. 2.

A side sill for a vehicle according to the first embodiment may include a first side sill frame 100, a second side sill frame 200, a first reinforcing frame 300, and a second reinforcing frame 400.

The first side sill frame 100 may be disposed in a widthwise internal side of the side sill in the X-axis direction.

The second side sill frame 200 may be coupled to the first side sill frame 100 to form a hollow portion S together with the first side sill frame 100. The second side sill frame 200 may be disposed in a widthwise external side of the side sill in the X-axis direction. The second side sill frame 200 may be bonded to the first side sill frame 100 by welding bonding or the like.

The first reinforcing frame 300 may be disposed in the hollow portion S, and one side thereof may be bonded to the first side sill frame 100 to form a first closed cross-section M1. The first reinforcing frame 300 may be bonded to the first side sill frame 100 to form the first closed cross-section M1, thereby improving the mechanical rigidity of the side sill for a vehicle.

The first reinforcing frame 300 may include a first upper flange 310, a pair of first web members 330, and a pair of first lower flanges 350 on an X-Z axis cross-section of the side sill.

The first web members 330 may be connected to both ends of the first upper flange 310 in a height direction, respectively. The first upper flange 310 may have a shape that is serpentine in a longitudinal direction of the side sill. A protruding surface P1 and an inserting surface P2 may be alternately formed in the longitudinal direction of the side sill, and an inclined surface P3 may be formed between the protruding surface P1 and the insertion surface P2.

The first web member 330 may extend from the first upper flange 310, and may extend toward a first inner surface 110 of the first side sill frame 100. The first reinforcing frame 300 may be bent-molded so that the first web member 330 and the first lower flange 350 are disposed to cross each other.

The first lower flange 350 may be bonded to the first inner surface 110 of the first side sill frame 100.

The second reinforcing frame 400 may be disposed in the hollow portion S, and one side thereof may be bonded to the first reinforcing frame 300 to form a second closed cross-section M2. The second reinforcing frame 400 may be bonded to the first reinforcing frame 300 at one side thereof to form the second closed cross-section M2, thereby improving the mechanical rigidity of the side sill for a vehicle.

The second reinforcing frame 400 may include a second upper flange 410, a pair of second web members 430, and a pair of second lower flanges 450 on an X-Z axis cross-section of the side sill.

The second upper flange 410 may have a shape that is serpentine in the longitudinal direction of the side sill. A protruding surface P1 and an insertion surface P2 may be alternately formed in the longitudinal direction of the side sill, and an inclined surface P3 may be formed between the protruding surface P1 and the insertion surface P2. The second upper flange 410 may be a flat surface. Accordingly, when an adhesive or the like for adhesion to the second side sill frame 200 is applied to the second upper flange 410, adhesion force of the second upper flange 410 may be improved, and convenience of adhesion and assembly operations may be improved.

The second web members 430 may be connected to both ends of the second upper flange 410 in the height direction, respectively.

The second web member 430 may extend from the second upper flange 410, and may extend toward the first inner surface 110 of the first side sill frame 100. The second lower flange 450 of the second reinforcing frame 400 may be bonded to the first web member 330 of the first reinforcing frame 300.

The second lower flange 450 may have a step portion Q2 formed between the second web members 430, and a gap between the pair of second lower flanges 450 in the Z-axis direction may be wider than a gap between the pair of second web members 430 in the Z-axis direction.

The first reinforcing frame 300 and the second reinforcing frame 400 may include a concavo-convex portion P continuously formed in the longitudinal direction of the side sill. For example, in the first reinforcing frame 300 and the second reinforcing frame 400, concavo-convex portions P may be continuously formed over the entire side sill in longitudinal direction.

In the concavo-convex portion P, a protruding surface P1 and an insertion surface P2 may be alternately formed in the longitudinal direction of the side sill, and an inclined surface P3 may be formed between the protruding surface P1 and the insertion surface P2.

In the side sill for a vehicle of the present disclosure, the first reinforcing frame 300 and the second reinforcing frame 400 may include a concavo-convex portion P, thereby improving rigidity without increasing the thickness of a steel material or the like forming the first reinforcing frame 300 and the second reinforcing frame 400.

In the side sill for a vehicle of the present disclosure, the concavo-convex portions P of the first and second reinforcing frames may be continuously formed in the longitudinal direction of the side sill, thereby stably resisting collision energy until the first and second reinforcing frames are sufficiently crushed.

In the first reinforcing frame 300 and the second reinforcing frame 400, the concavo-convex portions P may be continuously formed in the longitudinal direction by repeating the protruding surface P1, the inclined surface P3, the inserting surface P2, the inclined surface P3, and the protruding surface P1 on a longitudinal cross-section of the side sill.

For example, the first side sill frame 100 and the first reinforcing frame 300 may be bonded by spot welding, the first reinforcing frame 300 and the second reinforcing frame 400 may be bonded by laser welding or spot welding, and the second side sill frame 200 and the second reinforcing frame 400 may be bonded by an adhesive. The first side sill frame 100 and the second side sill frame 200 may be bonded by spot welding.

Various bonding methods such as welding bonding, adhesive bonding, and the like, may be applied to bonding between members such as the first reinforcing frame 300, the second reinforcing frame 400, the first side sill frame 100, and the second side sill frame 200.

At least one of the first side sill frame 100, the second side sill frame 200, the first reinforcing frame 300, and the second reinforcing frame 400 may be formed by foam-forming or crash-forming a steel sheet. This may contribute to reducing manufacturing costs by reducing mold costs.

The first side sill frame 100, the second side sill frame 200, the first reinforcing frame 300, and the second reinforcing frame 400 may be formed of ultra-high strength steel having a tensile strength of 980 MPa or more.

For example, the first side sill frame 100 and the second side sill frame 200 may be formed of a material containing 1470 MART steel, and the first reinforcing frame 300 and the second reinforcing frame 400 may be formed of a material including 1180 TRIP steel and 980 DP steel.

At least one of the first side sill frame 100, the second side sill frame 200, the first reinforcing frame 300, and the second reinforcing frame 400 may be formed of a steel material.

For example, the first side sill frame 100, the second side sill frame 200, the first reinforcing frame 300, and the second reinforcing frame 400 may be formed of steel. Accordingly, the mechanical rigidity of the side sill for a vehicle may be improved.

In the concavo-convex portion P, a protruding surface P1 and an insertion surface P2 may be alternately formed in the longitudinal direction of the side sill, and an inclined surface P3 may be formed between the protruding surface P1 and the insertion surface P2.

The protruding surface P1, the insertion surface P2, and the inclined surface P3 may be continuously formed on a width direction-height direction cross-section (X-Z-axis cross-section) of the side sill, intersecting the length direction of the side sill, respectively. For example, the protruding surface P1, the insertion surface P2, and the inclined surface P3 may be continuously formed over the entire width direction-height direction cross-section (X-Z-axis cross-section) of the side sill.

Each of the protruding surface P1, the insertion surface P2 and the inclined surface P3 may include a 'U-shaped' or 'V-shaped' cross-sectional portion open toward the first inner surface 110 of the first side sill frame 100 on the width direction-height direction cross-section (X-Z-axis cross-section) of the side sill.

In this case, a size of the cross-section on the width direction-height direction cross-section (X-Z axis cross-section) may decrease toward the protruding surface P1, the inclined surface P3, and the insertion surface P2.

In the side sill for a vehicle of the present disclosure, the protruding surface P1, the insertion surface P2, and the inclined surface P3 of the first and second reinforcing frames may be continuously formed on the width direction-height direction cross-section (X-Z-axis cross-section) of the side sill, intersecting the longitudinal direction of the side sill, so that there is an effect of stably resisting collision energy until the first and second reinforcing frames are sufficiently crushed.

The protruding surface P1 of the first reinforcing frame 300 may overlap the protruding surface P1 of the second reinforcing frame 400, and the insertion surface P2 of the first reinforcing frame 300 may overlap the insertion surface P2 of the second reinforcing frame 400.

The protruding surfaces P1 of the first reinforcing frame 300 and the second reinforcing frame 400 may overlap each other, and the insertion surfaces P2 of the first reinforcing frame 300 and the second reinforcing frame 400 may overlap each other, thereby improving coupling force between the first reinforcing frame 300 and the second reinforcing frame 400.

The protruding surfaces P1 of the first reinforcing frame 300 and the second reinforcing frame 400 may overlap each other, and the insertion surfaces P2 of the first reinforcing frame 300 and the second reinforcing frame 400 may overlap each other, and accordingly, a coupling position of the first reinforcing frame 300 and the second reinforcing frame 400 may be naturally induced, thereby improving workability of a worker.

The insertion surface P2 of the first reinforcing frame 300 may be bonded to the first insertion surface 110 of the first side sill frame 100, and the protruding surface P1 of the first reinforcing frame 300 may be spaced apart from the first inner surface 110 of the first side sill frame 100, thus forming a first buffer space R1.

The insertion surface P2 of the first reinforcing frame 300 may have an installation length Q1 of 15 to 50 mm in the longitudinal direction of the side sill.

The protruding surface P1 of the second reinforcing frame 400 may be bonded to the second inner surface 210 of the second side sill frame 200, and the insertion surface P2 of the second reinforcing frame 400 may be spaced apart from the second inner surface 210 of the second side sill frame 200, thus forming a second buffer space R2.

In the second reinforcing frame 400, the protruding surface P1 may have an installation length Q1 of 15 to 50 mm in the longitudinal direction of the side sill.

The insertion surface P2 of the first reinforcing frame 300 may be bonded to the first inner surface 110 of the first side sill frame 100, and the protruding surface P1 of the second reinforcing frame 400 may be bonded to the second inner surface 210 of the second side sill frame 200.

When the insertion surface P2 of the first reinforcing frame 300 and the protruding surface P1 of the second reinforcing frame 400 have an installation length Q1 of less than 15 mm in the longitudinal direction of the side sill, because a matching surface for bonding the insertion surface P2 and the first inner surface 110 is reduced, it may be difficult to perform bonds such as laser welding, spot welding or the like.

Furthermore, when the insertion surface P2 of the first reinforcing frame 300 and the protruding surface P1 of the second reinforcing frame 400 have an installation length Q1 exceeding 50 mm in the longitudinal direction of the side sill, there may be a problem in that the concavo-convex portion P may not properly perform a role of improving rigidity without increasing the thickness of the steel material forming the first reinforcing frame 300 and the second reinforcing frame 400.

In the first reinforcing frame 300 and the second reinforcing frame 400, the protruding surface P1 and the insertion surface P2 have an installation length Q1 of 15 to 50 mm in the longitudinal direction of the side sill, and a step portion Q2 of 2 to 10 mm may be formed between the protruding surface P1 and the insertion surface P2.

The insertion surface P2 of the first reinforcing frame 300 may be bonded to the first inner surface 110 of the first side sill frame 100. The protruding surface P1 of the second reinforcing frame 400 may be bonded to the second inner surface 210 of the second side sill frame 200.

In the first reinforcing frame 300 and the second reinforcing frame 400, when the protruding surface P1 and the insertion surface P2 have an installation length Q1 of less than 15 mm in the longitudinal direction of the side sill, because a matching surface for bonding the insertion surface P2 and the first inner surface 110 is reduced, it may be difficult to perform bonds such as laser welding, spot welding or the like.

Furthermore, in the first reinforcing frame 300 and the second reinforcing frame 400, when the protruding surface P1 and the insertion surface P2 have an installation length exceeding 50 mm in the longitudinal direction of the side sill, there may be a problem in that the concavo-convex portion P may not properly perform a role of improving rigidity without increasing the thickness of the steel material forming the first reinforcing frame 300 and the second reinforcing frame 400.

In the first reinforcing frame 300 and the second reinforcing frame 400, when the step portion Q2 between the protruding surface P1 and the insertion surface P2 is less than 2 mm, there may be a problem in that the concavo-convex portion P may not properly perform a role of improving rigidity without increasing the thickness of the steel material forming the first reinforcing frame 300 and the second reinforcing frame 400.

In the first reinforcing frame 300 and the second reinforcing frame 400, when the step portion Q2 between the protruding surface P1 and the insertion surface P2 exceeds 10 mm, it may be difficult to mold the first reinforcing frame 300 and the second reinforcing frame 400 using high-strength steel of 980 MPa or more, or there may be a problem of difficulty in molding, which makes molding impossible.

In the first reinforcing frame 300 and the second reinforcing frame 400, an installation width thereof may not decrease in a direction oriented from the second inner surface 210 of the second side sill frame 200 to the first inner surface 110 of the first side sill frame 100.

In an example, in the first reinforcing frame 300 and the second reinforcing frame 400, an installation width thereof may increase in a direction oriented from the first inner surface 110 of the first side sill frame 100 to the second inner surface 210 of the second side sill frame 200.

In another example, in the first reinforcing frame 300 and the second reinforcing frame 400, an installation width thereof may increase in a direction oriented from the first inner surface 110 of the first side sill frame 100 to the second inner surface 210 of the second side sill frame 200, or the first reinforcing frame 300 and the second reinforcing frame 400 may have at least the same installation width and the installation width thereof may not be reduced.

An impact may be applied in the X-axis direction from the second side sill frame 200, and when the installation width of the first and second reinforcing frames 300 and 400 increases in a direction away from a point in which the impact is applied, the first and second reinforcing frames 300 and 400 may be easily compressed and deformed in a direction in which the impact is applied, thereby improving load performance.

The first reinforcing frame 300 and the second reinforcing frame 400 may be formed by bending a single steel sheet in multiple stages.

The first and second reinforcing frames 300 and 400 may be formed by bending a single steel sheet in multiple stages. As the first reinforcing frame 300 is formed by bending a single steel sheet in multiple stages, the first and second reinforcing frames 300 and 400 formed of a single steel sheet may operate as one unit, thereby improving the mechanical rigidity of the side sill for a vehicle.

The first reinforcing frame 300 may be formed by bending a first steel sheet having a first thickness in multiple stages.

The protruding surface P1 and the insertion surface P2 of the first reinforcing frame 300 may have installation lengths of 10.7 to 35.7 times the first thickness in the longitudinal direction of the side sill, and in the first reinforcing frame 300, a step portion of 1.4 to 7.1 times the first thickness may be formed between the protruding surface P1 and the insertion surface P2.

For example, the first reinforcing frame 300 may be formed by bending a steel sheet having a size of 1.4 mm in multiple stages. In the first reinforcing frame 300, the protruding surface P1 and the insertion surface P2 may have an installation length of 15 to 50 mm in the longitudinal direction of the side seal, and a step portion of 2 to 10 mm may be formed between the protruding surface P1 and the insertion surface P2.

The second reinforcing frame 400 may be formed by bending a second steel sheet having a second thickness in multiple stages.

The protruding surface P1 and the insertion surface P2 of the second reinforcing frame 400 may have installation lengths of 12.5 to 41.7 times the second thickness in the longitudinal direction of the side sill, and in the second reinforcing frame 400, a step portion of 1.7 to 8.3 times the second thickness may be formed between the protruding surface P1 and the insertion surface P2.

For example, the second reinforcing frame 400 may be formed by bending a steel sheet having a size of 1.2 mm in multiple stages. In the second reinforcing frame 400, the protruding surface P1 and the insertion surface P2 may have an installation length of 15 to 50 mm in the longitudinal direction of the side seal, and a step portion of 2 to 10 mm may be formed between the protruding surface P1 and the insertion surface P2.

The first reinforcing frame 300 may have a bending point 370 with a shape of protruding outward (Z-axis direction) from the first closed cross-section M1.

The bending point 370 of the first reinforcing frame 300 may be formed to be spaced apart from the first inner surface 110 of the first side sill frame 100 by a distance of 30 to 70% of an installation width T of the first reinforcing frame 300.

When the bending point 370 is less than 30% or more than 70% of the installation width T of the first reinforcing frame 300 from the first inner surface 110 of the first side sill frame 100, normal crushing may not be performed while bending is not properly induced at the bending point 370 of the first reinforcing frame 300.

When the normal crushing does not occur in the first reinforcing frame 300, as in the comparative example described above, tilting deformation may occur and a problem may occur in which sufficient load performance cannot be achieved. Furthermore, this may be a major factor of uncertainty in exhibiting stable collision energy absorption performance under various collision environments by a side sill for a vehicle.

The first reinforcing frame 300 may include a first section 331 and a second section 333.

The first section 331 may be formed to extend toward the first inner surface 110 of the first side sill frame 100 with the bending point 370 as a boundary. The second section 333 may be bent with the bending point 370 as a boundary to extend toward the second inner surface 210 of the second side sill frame 200, and may form a bending angle 390 with the first section 331 inside the first closed cross-section M1.

There may be a bending point 370 in a boundary between the first section 331 and the second section 333. The first reinforcing frame 300 may have the first section 331 and the second section 333 bent with the bending point 370 a boundary.

The bending angle 390 may be formed inside the first closed cross-section M1 and may be less than 180 degrees.

In the first reinforcing frame 300, the bending angle 390 may be formed inside the first closed cross-section M1, and the bending angle 390 may range from 165 to 175 degrees. An angle θ formed by an extension line of the first section 331 and an extension line of the second section 333 may range from 5 to 15 degrees.

As the first section 331 and the second section 333 are bent based on the bending point 370, the bending angle 390 may be formed inside the first closed cross-section M1.

Since the first reinforcing frame 300 has the bending angle 390 in the range of 165 to 175 degrees, the rigidity of the first reinforcing frame 300 may be sufficiently secured, thereby stable inducing bending at the bending point 370.

When the bending angle 390 of the first reinforcing frame 300 is less than 165 degrees, the bending may be easily induced at the bending point 370, but as the bending becomes too easy to induce at the bending point 370 of the first reinforcing frame 300, the first reinforcing frame 300 may be bent at the bending point 370 before exerting load performance in terms of the design, leading to a decrease in the load performance.

Normal crushing does not occur in the first reinforcing frame 300, and tilting deformation may occur as in the comparative example described above, which may cause a problem in which sufficient load performance may not be achieved. Furthermore, this may be a major factor of uncertainty in exhibiting stable collision energy absorption performance under various collision environments by a side sill for a vehicle.

When the bending angle 390 exceeds 175 degrees, the bending may not be induced properly at the bending point 370, and the normal crushing may not be achieved.

The normal crushing does not occur in the first reinforcing frame 300, and the tilting deformation may occur as in the comparative example described above, which may cause a problem in which the load performance may not be achieved in terms of the design.

Hereinafter, referring to FIG. 9A to FIG. 10C, a deformation analysis result of a side sill for a vehicle of a first comparative example and a side sill for a vehicle of a first embodiment will be described.

Figure 9A:
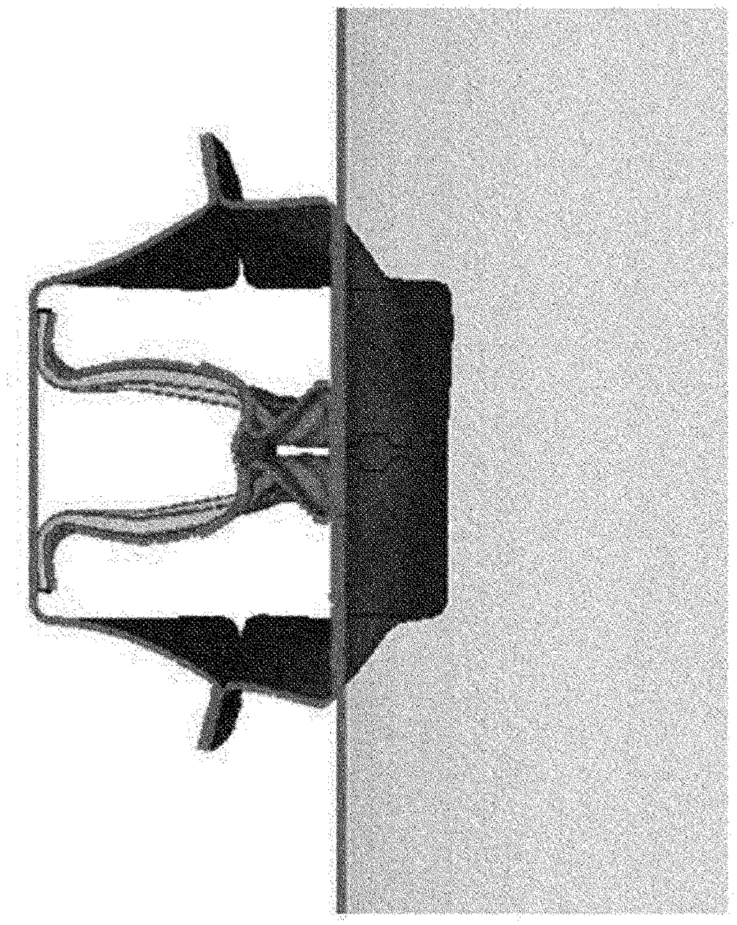
FIGS. 9A to 9C are deformation analysis results of a side sill for a vehicle of the first comparative example.
Figure 9B:
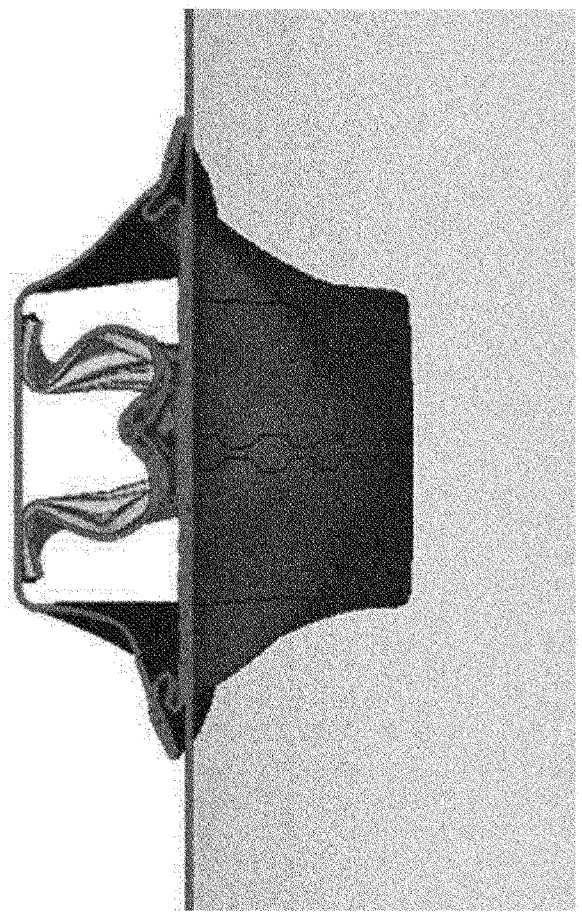
Figure 9C:
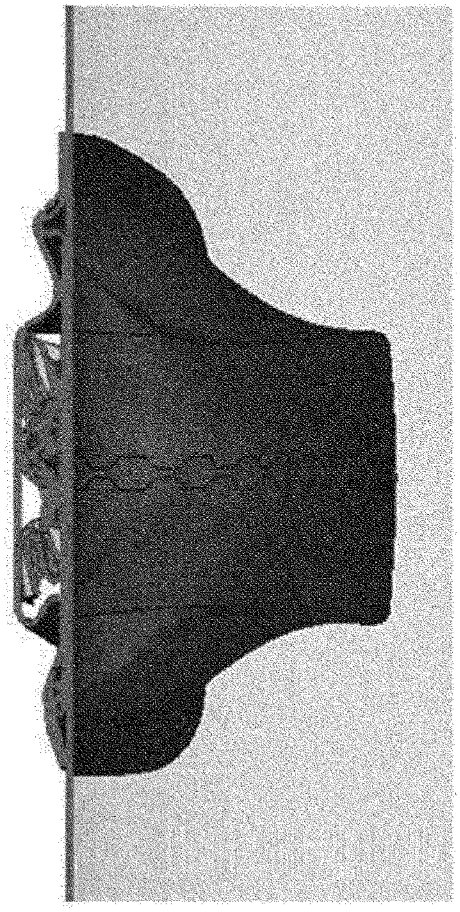

FIGS. 9A to 9C are deformation analysis results of a side sill for a vehicle of the first comparative example.

FIG. 9A is a deformation analysis result of an early collision phase of the first comparative example, FIG. 9B is a deformation analysis result of a mid-collision phase of the first comparative example, and FIG. 9C is a deformation analysis result of a late-collision phase of the first comparative example.

In the first comparative example, it may be seen that in the early collision phase, the second side sill frame 200 and the second reinforcing frame 400 are compressed and deformed in the X-axis direction.

In the first comparative example, it may be seen that in the mid-collision phase and the late-collision phase, deformation of the first reinforcing frame 300 and the second reinforcing frame 400 is not crushed in a symmetrical shape in the X-axis direction, and unstable crushing deformation of an asymmetric shape occurs.

There may be a problem in that this may be a major factor in instability in exhibiting stable collision energy absorption performance under various collision environments.

Figure 10A:
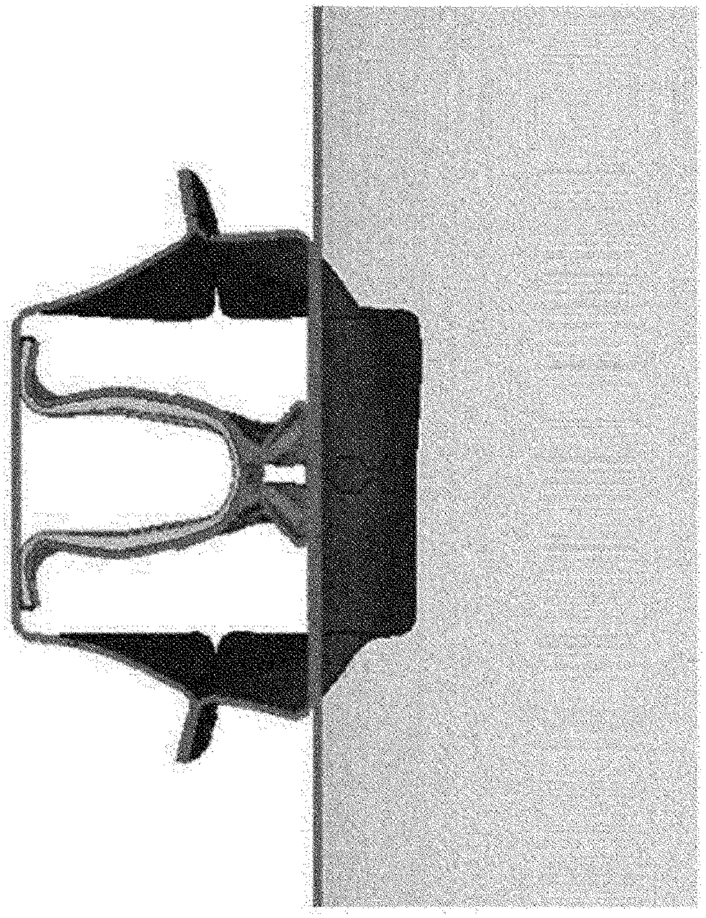
FIGS. 10A to 10C are deformation analysis results of a side sill for a vehicle according to the first embodiment.
Figure 10B:
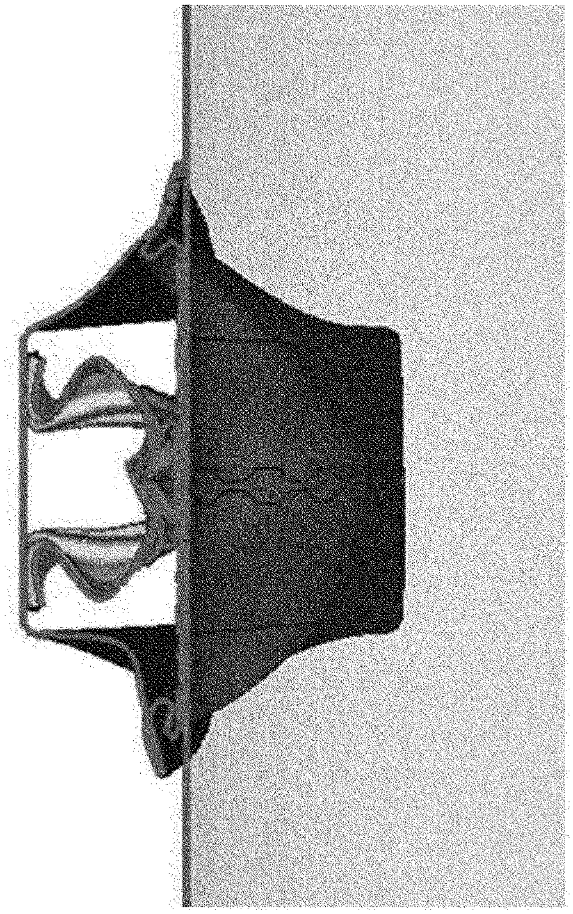
Figure 10C:
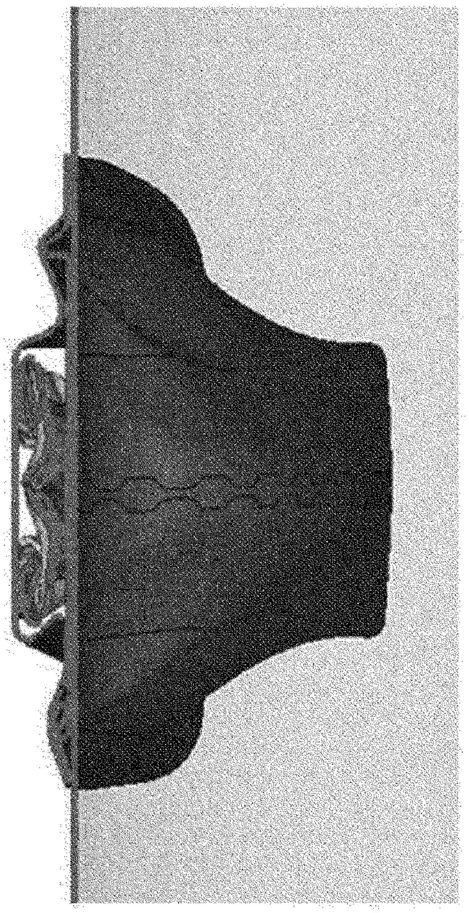

FIGS. 10A to 10C are deformation analysis results of a side sill for a vehicle according to a first embodiment.

FIG. 10A is a deformation analysis result of an early collision phase of the first embodiment, FIG. 10B is a deformation analysis result of a mid-collision phase of the first embodiment, and FIG. 10C is a deformation analysis result of a late-collision phase of the first embodiment.

In the first embodiment, it may be seen that in the early collision phase, the second side sill frame 200 and the second reinforcing frame 400 are compressed and deformed in the X-axis direction.

In the first embodiment, it may be seen that in the mid-collision phase and the late-collision phase, deformation of the first reinforcing frame 300 and the second reinforcing frame 400 is crushed in a symmetrical shape in the X-axis direction, resulting in stable crushing deformation.

It may be seen that deformation of the first reinforcing frame 300 and the second reinforcing frame 400 is not concentrated on either side, and is uniformly compressed in the X-axis direction.

Figure 11:
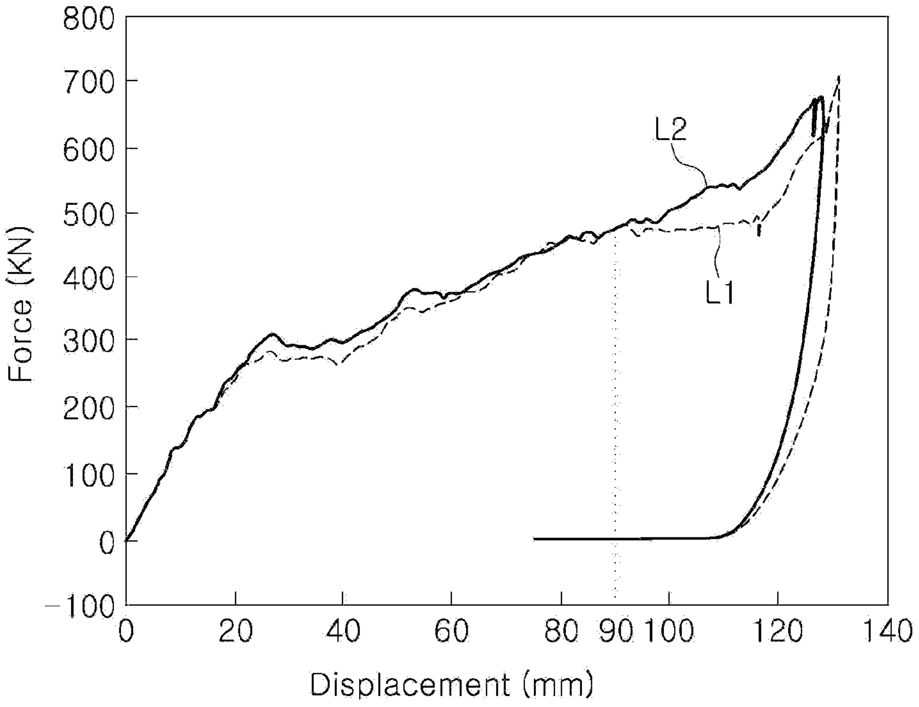
FIG. 11 is a side sill for a vehicle of the first comparative example of FIG. 1 and a load-displacement diagram of the first embodiment of FIG. 2.

FIG. 11 is a side sill for a vehicle of the first comparative example of FIG. 1 and a load-displacement diagram of the first embodiment of FIG. 2.

A load-displacement value of the side sill for a vehicle of the first comparative example of FIG. 1 is represented by the first value L1, and a load-displacement value of the side sill for a vehicle according to the first embodiment of FIG. 2 is represented by a second value L2.

Referring to the first value L1 and the second value L2, it may be seen that the side sill for a vehicle according to the first embodiment of FIG. 2 has a relatively low displacement under the same load, as compared to the side sill for a vehicle according to the first comparative example of FIG. 1.

It may be seen that for the first value L1, an impact absorption ability rapidly decreases at a displacement of 90 mm or more, which corresponds to the late-collision phase, while for the second value L2, impacts are stably absorbed even in the late-collision phase.

Specifically, internal energy of the side sill for a vehicle of the first comparative example was 47.9 KJ and a weight of the side sill for a vehicle of the first comparative example was 18.7 kg, and internal energy of the side sill for a vehicle of the first embodiment was 49.3 KJ and a weight of the side sill for a vehicle of the first embodiment was 18.9 kg.

That is, a ratio of internal energy per 1 kg of the side sill for a vehicle of the first comparative example is 2.56 (KJ/kg), and a ratio of internal energy per 1 kg of the side sill for a vehicle of the first embodiment is 2.62 (KJ/kg), from which it may be seen that the first embodiment has a higher ratio of internal energy per 1 kg than that of the first comparative example and thus has more excellent load performance.

Although the example embodiment of the present disclosure has been described in detail above, it will be obvious to those skilled in the art that the scope of the present disclosure is not limited thereto, and various modifications and variation may be made without departing from the technical concept of the present disclosure described in the claims.

DESCRIPTION OF REFERENCE CHARACTERS

100: FIRST SIDE SILL FRAME
110: FIRST INNER SURFACE
200: SECOND SIDE SILL FRAME
210: SECOND INNER SURFACE
300: FIRST REINFORCING FRAME
310: FIRST UPPER FLANGE
330: FIRST WEB MEMBER
331: FIRST SECTION
333: SECOND SECTION
350: FIRST LOWER FLANGE
370: BENDING POINT
390: BENDING ANGLE
400: SECOND REINFORCING FRAME
410: SECOND UPPER FLANGE
430: SECOND WEB MEMBER
450: SECOND LOWER FLANGE
M1: FIRST CLOSED CROSS-SECTION
M2: SECOND CLOSED CROSS-SECTION
P: CONCAVO-CONVEX PORTION
P1: PROTRUDING SURFACE
P2: INSERTION SURFACE
P3: INCLINED SURFACE
Q1: INSTALLATION LENGTH
Q2: STEP PORTION
R1: FIRST BUFFER SPACE
R2: SECOND BUFFER SPACE
S: HOLLOW PORTION
T: INSTALLATION WIDTH OF THE FIRST REINFORCING FRAME
U: POSITION OF THE BENDING POINT

The invention claimed is:

1. A side sill for a vehicle, comprising:
a first side sill frame;
a second side sill frame coupled to the first side sill frame to form a hollow portion together with the first side sill frame;
a first reinforcing frame disposed in the hollow portion and having one side bonded to the first side sill frame to form a first closed cross-section; and
a second reinforcing frame disposed in the hollow portion and having one side bonded to the first reinforcing frame to form a second closed cross-section,
wherein the first reinforcing frame and the second reinforcing frame include a concavo-convex portion that is continuously formed in a longitudinal direction of the side sill for a vehicle,
wherein the concavo-convex portion is configured so that a protruding surface and an insertion surface are alternately formed in a longitudinal direction of the side sill, and an inclined surface is formed between the protruding surface and the insertion surface,
wherein each of the protruding surface, the insertion surface, and the inclined surface is continuously formed on a width direction-height direction cross-section of the side sill, intersecting a longitudinal direction of the side sill,
wherein the inserting surface of the first reinforcing frame is bonded to a first inner surface of the first side sill frame, and
wherein the protruding surface of the first reinforcing frame is spaced apart from a first inner surface of the first side sill frame to form a first buffer space.

2. The side sill for a vehicle of claim 1, wherein at least one of the first side sill frame, the second side sill frame, the first reinforcing frame, and the second reinforcing frame is formed of a steel material.

3. The side sill for a vehicle of claim 1, wherein the protruding surface of the first reinforcing frame overlaps the protruding surface of the second reinforcing frame, and the insertion surface of the first reinforcing frame overlaps the insertion surface of the second reinforcing frame.

4. The side sill for a vehicle of claim 1, wherein the inserting surface of the first reinforcing frame has an installation length of 15 to 50 mm in the longitudinal direction of the side sill.

5. A side sill for a vehicle, comprising:
- a first side sill frame;
- a second side sill frame coupled to the first side sill frame to form a hollow portion together with the first side sill frame;
- a first reinforcing frame disposed in the hollow portion and having one side bonded to the first side sill frame to form a first closed cross-section; and
- a second reinforcing frame disposed in the hollow portion and having one side bonded to the first reinforcing frame to form a second closed cross-section,
- wherein the first reinforcing frame and the second reinforcing frame include a concavo-convex portion that is continuously formed in a longitudinal direction of the side sill for a vehicle,
- wherein the concavo-convex portion is configured so that a protruding surface and an insertion surface are alternately formed in a longitudinal direction of the side sill, and an inclined surface is formed between the protruding surface and the insertion surface,
- wherein each of the protruding surface, the insertion surface, and the inclined surface is continuously formed on a width direction-height direction cross-section of the side sill, intersecting a longitudinal direction of the side sill,
- wherein the protruding surface of the second reinforcing frame is bonded to a second inner surface of the second side sill frame, and
- wherein the insertion surface of the second reinforcing frame is spaced apart from the second inner surface of the second side sill frame to form a second buffer space.

6. The side sill for a vehicle of claim 5, wherein the protruding surface of the second reinforcing frame has an installation length of 15 to 50 mm in the longitudinal direction of the side sill.

7. The side sill for a vehicle of claim 1, wherein the first reinforcing frame and the second reinforcing frame are configured so that the protruding surface and the insertion surface have an installation length of 15 to 50 mm in the longitudinal direction of the side sill, and a step portion of 2 to 10 mm is formed between the protruding surface and the insertion surface.

8. The side sill for a vehicle of claim 1, wherein an installation width of the first reinforcing frame and an installation width of the second reinforcing frame are configured so that an installation width does not decrease in a direction oriented from a second inner surface of the second side sill frame to a first inner surface of the first side sill frame.

9. The side sill for a vehicle of claim 1, wherein the first reinforcing frame and the second reinforcing frame are formed by bending a single steel sheet in multiple stages.

10. The side sill for a vehicle of claim 1, wherein the first reinforcing frame has a bending point with a shape of protruding outward from the first closed cross-section.

11. The side sill for a vehicle of claim 10, wherein the first reinforcing frame is formed so that the bending point is spaced apart from a first inner surface of the first side sill frame by a distance of 30% to 70% of an installation width of the first reinforcing frame.

12. The side sill for a vehicle of claim 10, wherein the first reinforcing frame comprises:
- a first section extending toward a first inner surface of the first side sill frame with the bending point as a boundary; and
- a second section bent with the bending point as a boundary to extend toward a second inner surface of the second side sill frame, and forming a bending angle with the first section in the first closed cross-section.

13. The side sill for a vehicle of claim 12, wherein the first reinforcing frame is configured so that the bending angle is formed inside the first closed cross-section, and the bending angle has a range of 165 to 175 degrees.

* * * * *